United States Patent Office 3,652,611
Patented Mar. 28, 1972

3,652,611
PRODUCTION OF CARBOXYLIC ACIDS BY
OXIDATION OF 1,2-EPOXIDES
Clyde E. Bishop, Indianapolis, Ind., assignor to
Continental Oil Company, Ponca City, Okla.
No Drawing. Filed Dec. 30, 1970, Ser. No. 102,990
Int. Cl. C07c 51/24
U.S. Cl. 260—413                                        6 Claims

ABSTRACT OF THE DISCLOSURE 1,2-epoxides are converted to carboxylic acids by oxidizing the epoxides with nitric acid in the presence of a vanadium compound promoter at a temperature in the range of from about 0° C. to about 110° C.

BACKGROUND OF THE INVENTION

Field of the invention

This invention relates to the production of carboxylic acids. More particularly, the invention relates to the production of carboxylic acids from α-epoxide compounds.

Brief description of the prior art

Epoxide linkages are stable functional groups which resist rupture or attack by most chemical agents. It is known that epoxide compounds can be reacted with strong base to break the epoxide ring and form a carboxylic acid salt of the base. This salt may then be reacted with a strong mineral acid to form the free carboxylic acid. A process of this type is shown in Morway et al. U.S. Pat. 3,287,405.

Brief description of the present invention

The present invention provides a method for directly converting 1,2-epoxide compounds to n-carboxylic acids. The method comprises oxidizing the epoxide with nitric acid in the presence of a vanadium compound which functions as a promoter.

An object of the invention is to provide a new method for preparing valuable carboxylic acids.

Another object of the invention is to provide a valuable end use for α-olefins which can be converted to α-epoxides which can be then easily and economically converted to carboxylic acids.

Additional objects and advantages will become apparent as the following detailed description of the invention is read.

DETAILED DESCRIPTION OF A PREFERRED EMBODIMENT OF THE INVENTION

In carrying out the process of the present invention, the starting materials employed are 1,2-epoxides. The epoxides may be widely varying in molecular structure, and can be either straight or branched chain materials having varying chain lengths. The 1,2-epoxides of straight chain construction and containing from 4 to 30 carbon atoms are, however, preferred compounds for utilization in the practice of the invention.

The conversion of the 1,2-epoxide to the desired carboxylic acid products is accomplished by contacting the epoxide with nitric acid to break the epoxide ring and oxidize the epoxide directly to the carboxylic acids. The nitric acid utilized for this purpose may vary in strength from about 8 molar to about 21 molar. An acid strength of from 10 molar to 16 molar is, however, preferred.

The oxidation reaction is carried out at temperatures in the range of from about 0° C. to about 110° C. Preferably, however, a temperature in the range of from 20° C. to 100° C. is employed. Treatment with the nitric acid at the described temperature may be carried out over widely varying periods of time, but a total reaction time of about 2 hours is preferred.

Although it is not entirely essential that a promoter be utilized in carrying out the oxidation reaction, markedly superior results have been realized when a vanadium compound is utilized for this purpose. Ammonium vanadate and vanadium pentoxide are examples of vanadium compounds which function effectively. The amount of the promoter utilized is from about 0.001 mole per liter of nitric acid utilized, to about 0.5 mole per liter of the acid. In addition to a promoter compound of the type described, it is also desirable to add to the reaction mixture, a reaction initiator selected from the group consisting of nitrite compounds and nitrogen dioxide. The amount of this material used is preferably at least 0.2 mole per liter of nitric acid utilized.

As an example of the actual practice of the method of the invention, 500 ml. of 15.4 molar nitric acid were charged to a three-necked flask equipped with reflux condenser, thermometer, stirrer and dropping funnel. 0.23 gram of ammonium vanadate and 6.90 grams of sodium nitrite were also added to the flask.

After then heating the contents of the flask to 80° C., 14.8 grams of octene-1 epoxide were slowly added to the flask in a drop-wise fashion by the use of an addition funnel. The total time required for addition of the epoxide was 25 minutes. The total reaction time utilized was 2 hours measured from the commencement of the addition of the epoxide to the flask.

At the end of the described reaction time, the flask and its contents were permitted to cool, and the carboxylic acid products were then isolated from the remainder of the reaction products. Upon product analysis, it was found that the reaction yielded 10.9 grams of carboxylic acids, and 0.3 gram of neutral material. Of the acids, 12.41 weight percent was found to be hexanoic acid and 83.66 weight percent was found to be heptanoic acid.

From the foregoing description of the invention, it will be perceived that the present invention provides a new method by which carboxylic acids may be produced. The α-epoxides utilized as starting materials are converted efficiently and directly to the desired acid products by a simple oxidation reaction utilizing nitric acid, preferably in the presence of a vanadium compound promoter and a suitable reaction initiator.

Although certain specific reaction conditions and parameters have been herein set forth in order to provide an example of the practice of the invention sufficient to guide those skilled in the art, it is to be understood that various changes and modifications to the described reaction conditions and parameters can be effected without departure from the basic principles which underlie the invention. Changes and innovations of this type, which continue to rely upon such principles, are therefore deemed to be circumscribed by the spirit and scope of the invention except as the same may be necessarily limited by the appended claims or reasonable equivalents thereof.

What is claimed is:

1. The method of preparing carboxylic acids which comprises oxidizing a 1,2-epoxide of a straight or branched chain hydrocarbon having 4–30 carbon atoms with from about 8 molar to about 21 molar nitric acid at a reaction temperature of from about 0° C. to about 110° C.

2. The method of preparing carboxylic acids as defined in claim 1 wherein said oxidation is carried out in the presence of a vanadium compound.

3. The method of preparing carboxylic acids as defined in claim 1 wherein the oxidation is carried out at temperatures of from about 20° C. to about 100° C. for a period of about 2 hours.

4. The method of preparing carboxylic acids as defined in claim 3 wherein the oxidation is carried out utilizing nitric acid having a strength of from about 10 molar to about 16 molar.

5. The method of preparing carboxylic acids as defined in claim 3 wherein the oxidation is carried out in the presence of an initiator compound selected from the group consisting of nitrite compounds and nitrogen dioxide.

6. The method of preparing carboxylic acids as defined in claim 5 wherein the oxidation is carried out at a temperature of from about 20° C. to about 110° C.

References Cited
UNITED STATES PATENTS

| | | | |
|---|---|---|---|
| 2,389,950 | 11/1945 | Bremner et al. | 260—537 |
| 2,937,201 | 5/1960 | Ziegenbein | 260—537 |
| 3,287,405 | 11/1966 | Morway et al. | 260—537 |

JAMES A. PATTEN, Primary Examiner

V. GARNER, Assistant Examiner

U.S. Cl. X.R.

260—540

PO-1050
(5/69)

UNITED STATES PATENT OFFICE
CERTIFICATE OF CORRECTION

Patent No. 3,652,611    Dated March 28, 1972

Inventor(s) Clyde E. Bishop

It is certified that error appears in the above-identified patent and that said Letters Patent are hereby corrected as shown below:

Claim 5, line 2, please change "3" to -- 2 --.

Signed and sealed this 2nd day of July 1974.

(SEAL)
Attest:

EDWARD M. FLETCHER, JR.
Attesting Officer

C. MARSHALL DANN
Commissioner of Patents